Nov. 27, 1951  P. E. KOPP  2,576,519
APPARATUS AND METHOD FOR CLAY BAKING
Filed Jan. 11, 1949  2 SHEETS—SHEET 1
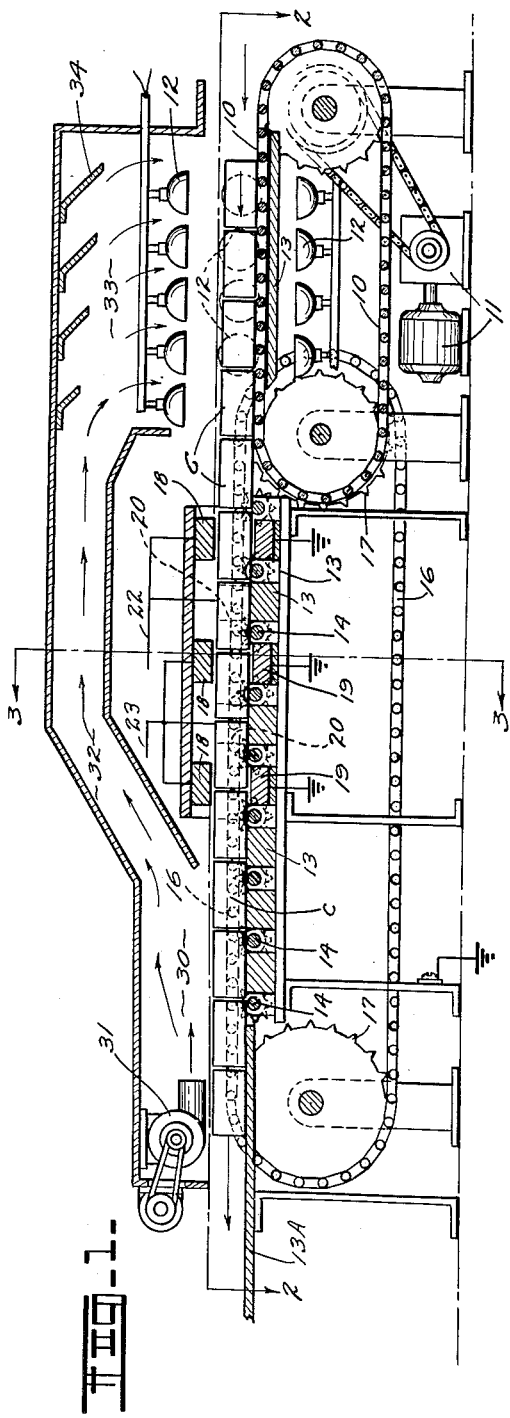
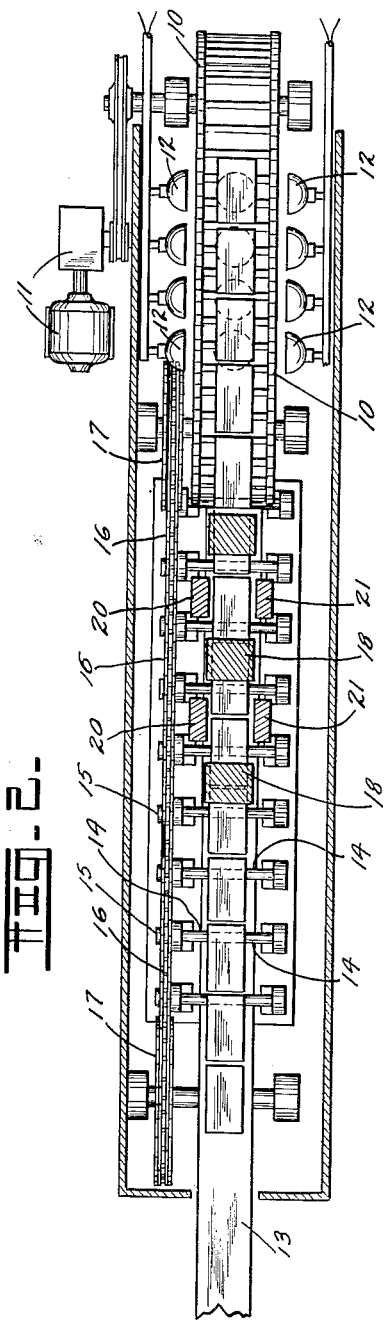
INVENTOR.
Philip E. Kopp.
BY
W B Harpman
ATTORNEY.

Nov. 27, 1951        P. E. KOPP        2,576,519
APPARATUS AND METHOD FOR CLAY BAKING
Filed Jan. 11, 1949        2 SHEETS—SHEET 2
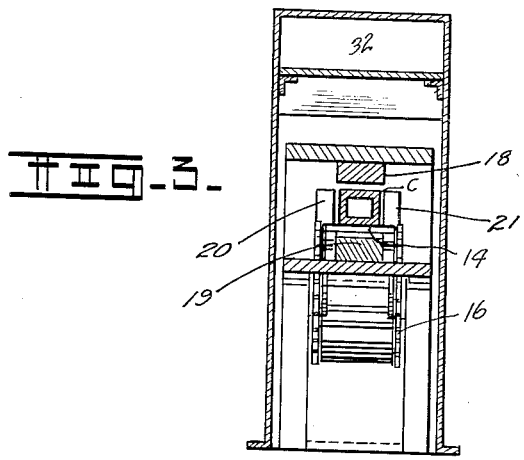
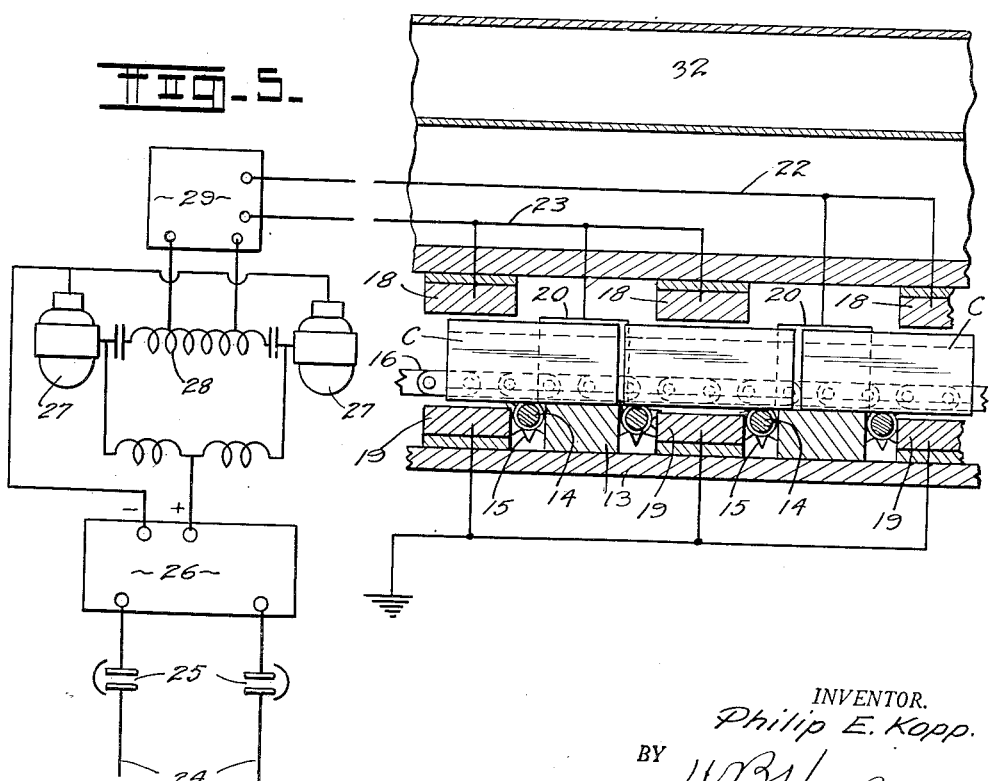
INVENTOR.
Philip E. Kopp.
BY W. B. Harpman
ATTORNEY.

Patented Nov. 27, 1951

2,576,519

UNITED STATES PATENT OFFICE 2,576,519

APPARATUS AND METHOD FOR CLAY BAKING

Philip E. Kopp, Youngstown, Ohio

Application January 11, 1949, Serial No. 70,261

3 Claims. (Cl. 219—47)

This invention relates to clay baking and more particularly to the drying and baking of clay products such as flue tile and the like.

The principal object of the invention is the provision of apparatus and the method for baking clay products.

A further object of the invention is the provision of apparatus for the continuous production of baked clay products.

A still further object of the invention is the provision of a method of producing baked clay products on a continuous production line.

A still further object of the invention is the provision of an apparatus incorporating dielectric heating of the non-conducting clay materials processed.

A still further object of the invention is the provision of a method of using dielectric heating in the drying and baking of clay products.

The apparatus and method relating to the baking of clay products as disclosed herein contemplates the elimination of the heretofore believed necessary forming, air drying and kiln baking of clay products and the heretofore necessary relatively long time interval for accomplishing these several successful operations. The invention may be practiced in the formation of any clay product or any other product formed of non-conducting material wherein the removal of moisture from the product in pre-baking stages is essential and the controlled heating and cooling of the object is necessary to the end that a product be produced that is not warped, cracked or otherwise rendered unsatisfactory for use.

It is known that dielectric heating has the ability to create heat within non-conducting materials uniformly throughout the material and the apparatus and method disclosed herein utilize such dielectric heating by subjecting the clay product to a suitably controlled high frequency field existing between two metallic surfaces having a relatively high difference of potential therebetween. As the dielectric heating creates heat instantly within the materials rather than forcing the heat from the outside surface, it is particularly adaptable for the drying and baking of clay products wherein a considerable moisture content exists in the initial stages of processing.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side view with parts broken away and parts in cross section illustrating apparatus for drying and baking clay products.

Figure 2 is a horizontal section taken on line 2—2 of Figure 1.

Figure 3 is a vertical section taken on line 3—3 of Figure 1.

Figure 4 is an enlarged detail view of a portion of the apparatus shown in Figure 1.

Figure 5 is a schematic view of a source of radio frequency currents for the apparatus shown in Figures 1 through 4.

By referring to the drawings and Figures 1 and 2 in particular it will be seen that a conveyor 10 is positioned for the reception of clay products such as flue tile and indicated by the letter C and energized as by a motor and gear reduction box 11. The clay products C are carried from right to left of the apparatus as illustrated in Figures 1 and 2 of the drawings and it will be observed that a plurality of infrared drying lamps 12 or their equivalent surround the clay products C on the conveyor 10 as they are moved thereby. In order that the clay products C may be uniformly heated, the conveyor 11 is preferably formed of chains having a plurality of relatively thin rods spacing the same so that the infrared lamps 12 or their equivalent beneath the conveyor 10 may radiate heat on all surfaces of the clay products C. Positioned in end to end relation to the conveyor 10 there is a roller table 13 having a plurality of rollers 14 positioned transversely thereof and spaced with respect to one another so that they may receive and support a clay product C delivered thereto by the conveyor 10. Each of the ends of the rollers 14 is provided with sprockets 15 and a continuous chain 16 is passed thereover and is also engaged upon a driving sprocket 17 powered by the motor and gear reduction box 11 heretofore referred to.

A plurality of electrodes 18 are positioned above the roller table 13 and in spaced relation to one another and a plurality of ground potential electrodes 19 are positioned in the surface of the roller table 13 and immediately below the path of the clay products C moving therealong. The electrodes 19 are aligned vertically with the electrodes 18. Positioned alternately between the spaced electrodes 18 and 19 there are electrodes 20 and 21 which are positioned on a vertical line and disposed along the sides of the path of the clay products C. The electrodes 20 on the other side of the apparatus are connected along with the electrodes 18 to a suitable source of radio frequency currents and the electrodes 21 are maintained at different potential along with the electrodes 19 heretofore referred to. The clay products moving along the rollers 14 of the roller table 13 are therefore subjected alternately to dielectric heating currents on vertical and horizontal planes, respectively, to the end that controlled baking of the clay products C may be accomplished.

It is known that the degree of heat generated in an object by the molecular movement therein varies in accordance with the frequency of the current passed therethrough. Thus, the higher the frequency of current passed through the article, the higher the heat created as the high frequency current creates a disturbance of the molecules of the material in the dielectric heating field. It is therefore desirable to control the heating of the clay products and particularly the baking stage thereof by bringing up the temperature of the clay product on a predetermined cycle so that warping and cracking of the article will not occur. To this end the electrodes 18 and 20 are grouped in several groups as best illustrated in Figures 4 and 5 of the drawings and those electrodes adjacent the conveyor 10 and which apply the initial baking heat to the clay products C are energized at a lower frequency than those further along the roller table 13 so that the heat of the clay products may be built up progressively as the same pass along the roller table 13 and into and through the baking zone.

By referring now to Figures 4 and 5 of the drawings it will be seen that a circuit wire 22 connects one group of the electrodes 18 with the dielectric current source while another circuit wire 23 connects a different group of the electrodes 18 with another current source of a higher frequency. The power source shown in Figure 5 of the drawings in schematic view comprises an alternating current power supply generally indicated by the numeral 24 incorporating breakers 25 and a high voltage direct current rectifier and transformer 26. The output of the rectifier and transformer 26 is supplied to oscillating tubes 27 and connecting circuits 28 which in turn are connected directly or indirectly to the circuit wires 22 and 23 heretofore mentioned in connection with Figure 4 of the drawings. Separate power sources are utilized for the different radio frequencies necessary as heretofore described or the incorporation of a frequency changer 29 in one of the circuit wires 22 or 23. It will thus be seen that clay products C passing along the roller table 13 by reason of the powered rollers 14 will be subjected to dielectric heating currents on both vertical and horizontal planes and at higher frequencies as they progress through the apparatus whereby a satisfactory baking operation may be obtained.

Upon leaving the area of the electrodes 18, 19, 20 and 21, the clay products C continue to roll along in an extended section 13A of the roller table 13 and including transversely positioned powered rollers 14 and into a control cooling chamber 30. Cooling air is introduced into the cooling chamber 30 by a blower 31 and the air passes progressively over the clay products C and is then directed by a duct 32 around the dielectric baking section of the apparatus and into a chamber 33 in which the infrared, preheating lamps 12 or their equivalent are positioned. The heated air is directed by suitable baffles 34 onto the clay products C entering the apparatus on the conveyor 10 and with the preheated air materially assists in the drying operation necessary as a preliminary step to the baking operation heretofore described. It will be obvious that if desired the infrared heating units 12 may be de-energized during the continuous operation of the device as sufficient preheated air is delivered to the chamber 33 to efficiently dry the clay products C.

In operation the apparatus is aligned end to end with the press producing the clay products so that the product of the press may be produced directly onto the conveyor 10 from whence the clay product is dried and delivered to the roller table 14 and passed to the dielectric heating stage for baking. It is then cooled at a desirable rate by the air cooling currents in the chamber 30 and delivered from the far end of the apparatus in completed form.

It will thus be seen that the hand operations heretofore believed necessary in the production of clay products are eliminated by the provision of apparatus and method for continuously producing the clay products and which clay products may be operated intermittently, if desired, without affecting the quality of the clay products produced therein. It will also be seen that the apparatus and method disclosed herein meet the several other objects of the invention as hereinbefore set forth to the end that an efficient clay drying, baking and cooling procedure has been disclosed utilizing controlled dielectric heating for baking of the clay products.

Having thus described my invention, what I claim is:

1. The method of baking clay products wherein the clay products are moved horizontally and dried, and subsequently subjected to dielectric heating currents of one frequency and subsequently subjecting the clay products to dielectric heating currents of a higher frequency, and subsequently cooling the clay products by subjecting the same to a cooling medium whereby the clay products may be predried, progressively baked and cooled.

2. The method of baking clay products wherein the clay products are dried and subsequently moved so as to subject the clay products alternately to dielectric currents directed vertically therethrough and dielectric currents directed horizontally therethrough and of progressively higher frequencies for progressively baking the said clay products uniformly and subsequently subjecting the clay products to a cooling medium for controlling the cooling rate thereof.

3. Apparatus for continuously producing baked clay products and including longitudinally extending conveying means, a chamber positioned about one end of the said conveying means adjacent the point of introduction of the said clay products, a plurality of oppositely disposed pairs of electrodes positioned alternately above, below and at the sides of the said conveyor, a source of dielectric heating currents and means connecting the said electrodes adjacent the said chamber with the said source of dielectric currents, a secondary source of higher frequency dielectric heating currents and means connecting the others of the electrodes with the said secondary source of dielectric heating current, and a secondary chamber formed about the said conveyor and at the opposite end thereof with respect to the first mentioned chamber, and means for introducing air thereinto and duct means by passing the said electrodes and connecting the said chambers to one another whereby air heated in cooling the baked clay products is directed through the duct and into the first mentioned chamber and used for drying the clay products when the apparatus is in continuous operation.

PHILIP E. KOPP.

REFERENCES CITED

The following references are of record in the file of this patent:

UNITED STATES PATENTS

| Number | Name | Date |
|---|---|---|
| 925,902 | Harper et al. | June 22, 1909 |
| 1,468,947 | Jeffery | Sept. 25, 1923 |
| 2,231,457 | Stephen | Feb. 11, 1941 |
| 2,319,174 | Wilson | May 11, 1943 |
| 2,415,025 | Grell et al. | Jan. 28, 1947 |
| 2,421,334 | Kline et al. | May 27, 1947 |
| 2,436,732 | Rowe | Feb. 24, 1948 |
| 2,454,370 | Beaubien | Nov. 23, 1948 |
| 2,464,403 | Klingaman | Mar. 15, 1949 |
| 2,464,404 | Gillespie | Mar. 15, 1949 |
| 2,472,708 | Jones | June 7, 1949 |

FOREIGN PATENTS

| Number | Country | Date |
|---|---|---|
| 566,927 | Great Britain | Jan. 19, 1945 |
| 605,806 | Great Britain | July 30, 1948 |